(12) United States Patent
Arora et al.

US007799548B2

(10) Patent No.: US 7,799,548 B2
(45) Date of Patent: Sep. 21, 2010

(54) METHOD OF STRIPPING GENETICALLY TAGGED BIOMOLECULES FROM POROUS SOLID ION EXCHANGE WAFER

(75) Inventors: Michelle B. Arora, Woodridge, IL (US); Jamie A. Hestekin, Morton Grove, IL (US); YuPo J. Lin, Naperville, IL (US); Edward J. St. Martin, Libertyville, IL (US); Seth W. Snyder, Lincolnwood, IL (US)

(73) Assignee: Uchicago Argonne, LLC, Chicago, IL (US)

( * ) Notice: Subject to any disclaimer, the term of this patent is extended or adjusted under 35 U.S.C. 154(b) by 750 days.

(21) Appl. No.: 11/732,992

(22) Filed: Apr. 5, 2007

(65) Prior Publication Data

US 2007/0243602 A1    Oct. 18, 2007

Related U.S. Application Data

(60) Division of application No. 10/702,798, filed on Nov. 5, 2003, now Pat. No. 7,306,934, which is a continuation of application No. 10/676,942, filed on Sep. 30, 2003, now abandoned.

(60) Provisional application No. 60/423,925, filed on Nov. 5, 2002.

(51) Int. Cl.
*C12N 9/00* (2006.01)
*C12N 11/02* (2006.01)
*C12N 11/08* (2006.01)
*C12P 1/00* (2006.01)
*C12M 1/00* (2006.01)
*C07K 1/14* (2006.01)
*C07K 1/22* (2006.01)
*C07K 1/24* (2006.01)
*C07K 17/02* (2006.01)
*C07K 17/08* (2006.01)

(52) U.S. Cl. .................. 435/183; 435/41; 435/177; 435/180; 435/289.1; 530/412; 530/413; 530/415; 530/812; 530/815

(58) Field of Classification Search .................. None
See application file for complete search history.

(56) References Cited

U.S. PATENT DOCUMENTS 6,071,397 A    6/2000  Terada
6,495,014 B1   12/2002 Datta
6,797,140 B2   9/2004  Lin

FOREIGN PATENT DOCUMENTS

WO    WO 01/12292 A1 *  2/2001

* cited by examiner

*Primary Examiner*—David M Naff
(74) *Attorney, Agent, or Firm*—Olson & Cepuritis, Ltd.

(57) ABSTRACT

A porous solid ion exchange wafer having a combination of a biomolecule capture-resin and an ion-exchange resin forming a charged capture resin within said wafer. Also disclosed is a porous solid ion exchange wafer having a combination of a biomolecule capture-resin and an ion-exchange resin forming a charged capture resin within said wafer containing a biomolecule with a tag. A separate bioreactor is also disclosed incorporating the wafer described above.

14 Claims, 7 Drawing Sheets

Regeneration of Enzyme on Capture Resin in Resin Wafer

| | Bound | Stripped | Rebound |
|---|---|---|---|
| His-GFOR | yes | yes | yes |
| Biotin~Avi-GFOR | yes | yes | not tested |

Tagged-enzymes can be washed off by capture molecule homologues, thus enabling *in situ* regeneration. Because of *in situ* regeneration, the Separative Bioreactor needs servicing only once a year, rather than every two months.

METHOD OF STRIPPING GENETICALLY TAGGED BIOMOLECULES FROM POROUS SOLID ION EXCHANGE WAFER

RELATED APPLICATIONS

This application is a division of application Ser. No. 10/702,798, filed Nov. 5, 2003, now U.S. Pat. No. 7,306,934, which is a continuation of application Ser. No. 10/676,942, filed Sep. 30, 2003, now abandoned, which claims benefit of provisional application Ser. No. 60/423,925, filed Nov. 5, 2002, the entire contents of which are incorporated herein by reference.

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

BACKGROUND OF THE INVENTION

Electrodeionization (EDI) technology utilizes loose ion exchange resins used for water purification. In these commercially available systems, water is fed through an EDI stack, and dilute charged particles are removed. Because the resin is loosely held in the stack, sealing is difficult and leakage can be a problem. Previous technology developed at Argonne National Laboratory (ANL) uses an ion exchange resin EDI system to remove charged impurities (e.g., salts) from commercially valuable products, whereby leakage becomes a significant concern, see U.S. Pat. No. 6,495,014, the entire disclosure of which is herein incorporated by reference. The wafer used in the ANL bioreactor was also developed at ANL and is disclosed in application Ser. No. 10/213,721 filed Aug. 6, 2002, entire disclosure of which is incorporated by reference.

BACKGROUND OF THE INVENTION

Electrodeionization (EDI) technology utilizes loose ion exchange resins used for water purification. In these commercially available systems, water is fed through an EDI stack, and dilute charged particles are removed. Because the resin is loosely held in the stack, sealing is difficult and leakage can be a problem. Previous technology developed at Argonne National Laboratory (ANL) uses an ion exchange resin EDI system to remove charged impurities (e.g., salts) from commercially valuable products, whereby leakage becomes a significant concern, see U.S. Pat. No. 6,495,014, the entire disclosure of which is herein incorporated by reference. The wafer used in the ANL bioreactor was also developed at ANL and is disclosed in application Ser. No. 10/213,721 filed Aug. 6, 2002, entire disclosure of which is incorporated by reference. Thus, a new resin EDI system was designed to prevent leakage. The resins are packed tightly together in a "resin wafer" used to contain and separate charged molecules in EDI.

Chemical reactors utilize chemical reactions and catalysts to convert starting material to commercially valuable products, where separations technologies are required for the downstream capture of the chemical product, to separate-out the product from by-products and starting material. Bioreactors utilize biological components to convert starting material to commercially valuable products and also require downstream separations to purify product from starting material. Conventionally, the production and the separation occur in separate process components. Previous ANL technology has combined these two process components, the EDI separation with the biological production to create the "Separative Bioreactor".

SUMMARY OF THE INVENTION

The resin wafer in this invention is composed of two kinds of resins, one is the ion-exchange resin (i.e., same-charge or mixed-charge ion-exchange resins) and the other is the biomolecule capture-resin. The combination of the biomolecule capture-resins and the ion-exchange resins in the resin wafer provide the inventive "charged capture resin" The charged capture resin enables genetically engineered tagged-biomolecule to be specifically immobilized within the separative bioreactor and in situ biomolecule stripping and regeneration, while maintaining normal biomolecule activity rates.

Accordingly, it is any object of the present invention to provide a porous solid ion exchange wafer having a combination of a biomolecule capture-resin and an ion-exchange resin forming a charged capture resin within the wafer.

Still another object of the invention is to provide a wafer wherein the tag encodes histidine or multiple histidines in sequence or interspersed within a sequence (HAT tag).

Yet another object of the invention is to provide a separative bioreactor, comprising an anode and a cathode, a plurality of reaction chambers at least some being formed from a porous solid ion exchange wafer having a combination of an biomolecule capture-resin and an ion-exchange resin forming a charged capture resin within the wafer and having a genetically tagged biomolecule immobilized thereon, each of the porous solid ion exchange wafers having a charged capture resin there within being interleaved between a cation exchange membrane and an anion exchange membrane, and mechanism for supplying an electric potential between the anode and the cathode.

A still further object of the invention is to provide a method of in situ stripping a genetically tagged biomolecule from a porous solid ion exchange wafer in a bioreactor, the wafer having a combination of a biomolecule capture-resin and an ion-exchange resin forming a charged capture resin within the wafer and having a genetically tagged biomolecule immobilized thereon, comprising contacting the porous solid ion exchange wafer in the bioreactor with a stripping fluid at a temperature and for a time sufficient to strip at least some of the genetically tagged biomolecule therefrom.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 6 is a representation of the affect of regeneration in situ of enzymes on capture resin on a resin wafer.

DESCRIPTION OF THE PREFERRED EMBODIMENT

Figure 1:
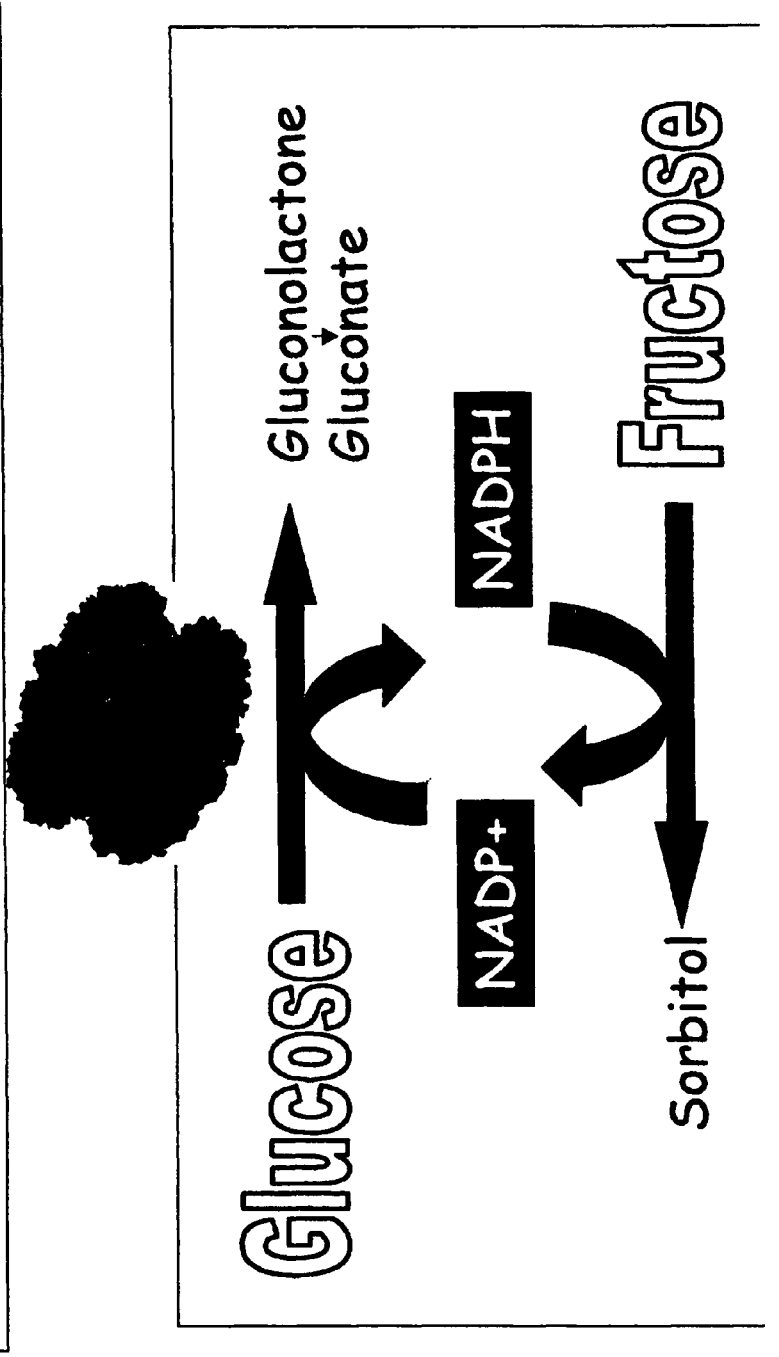
FIG. 1 is a diagrammatic representation of a representative enzyme immobilization and reaction.
Figure 2:
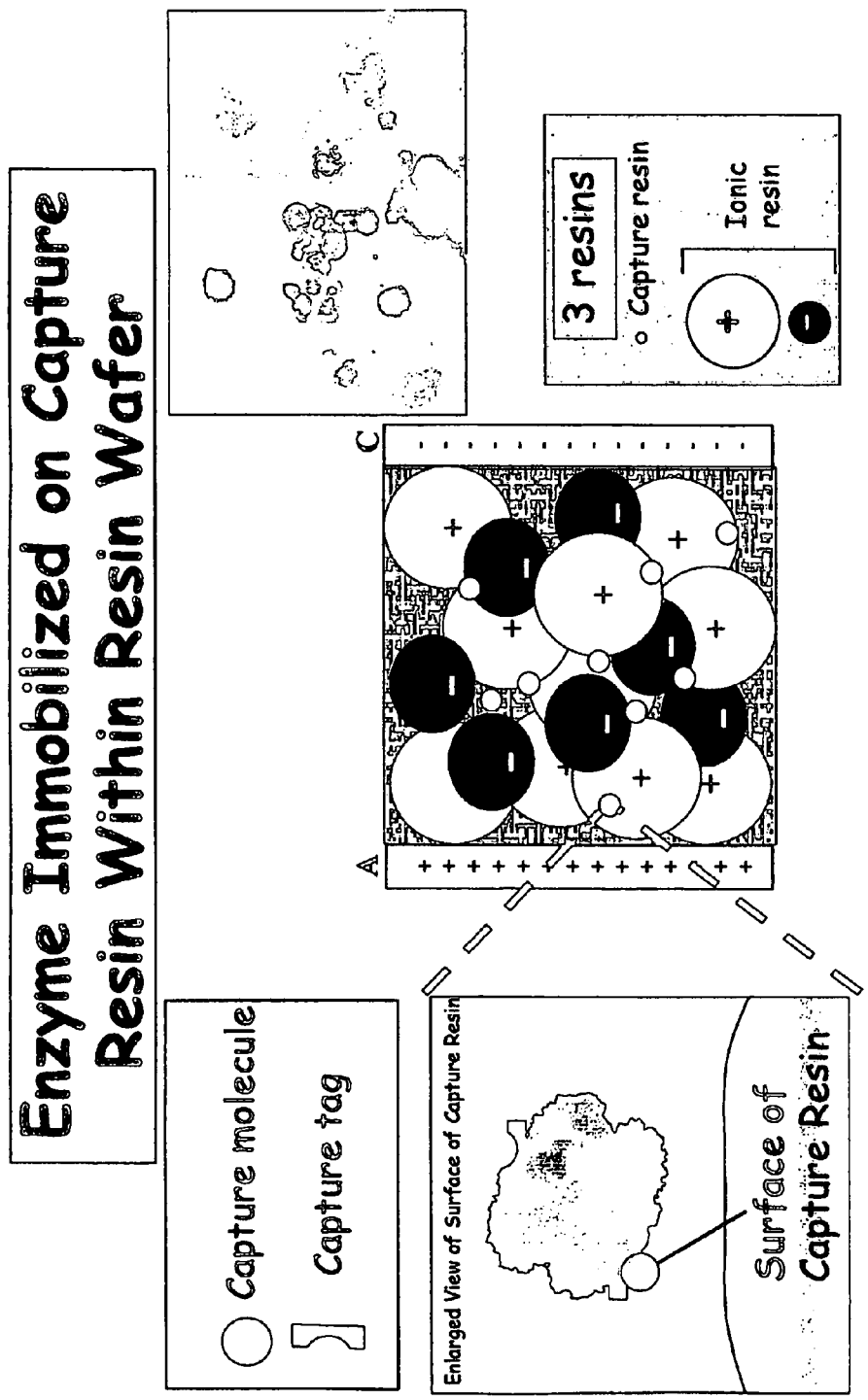
FIG. 2 is a representation illustration of genetically engineered enzymes tagged at the end or C-terminus.
Figure 3:
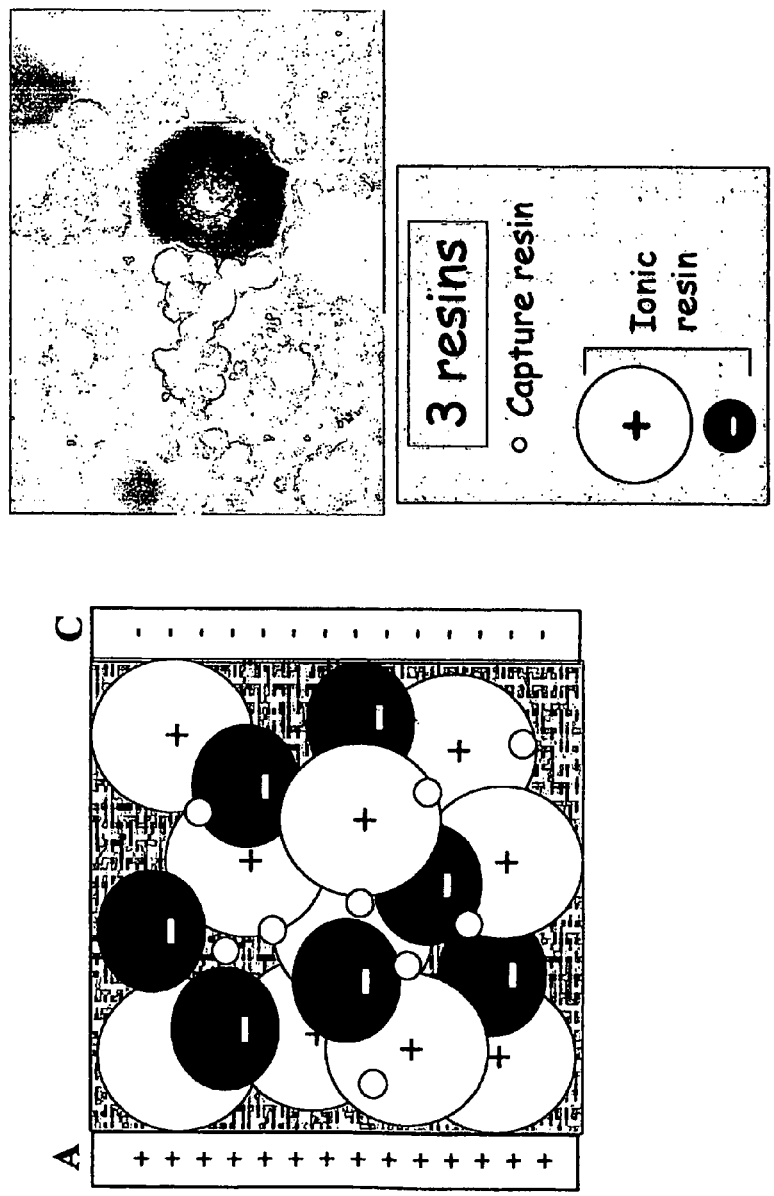
FIG. 3 is a representation of an EDI 3 resin wafer with the capture resin of the present inventions.
Figure 4:
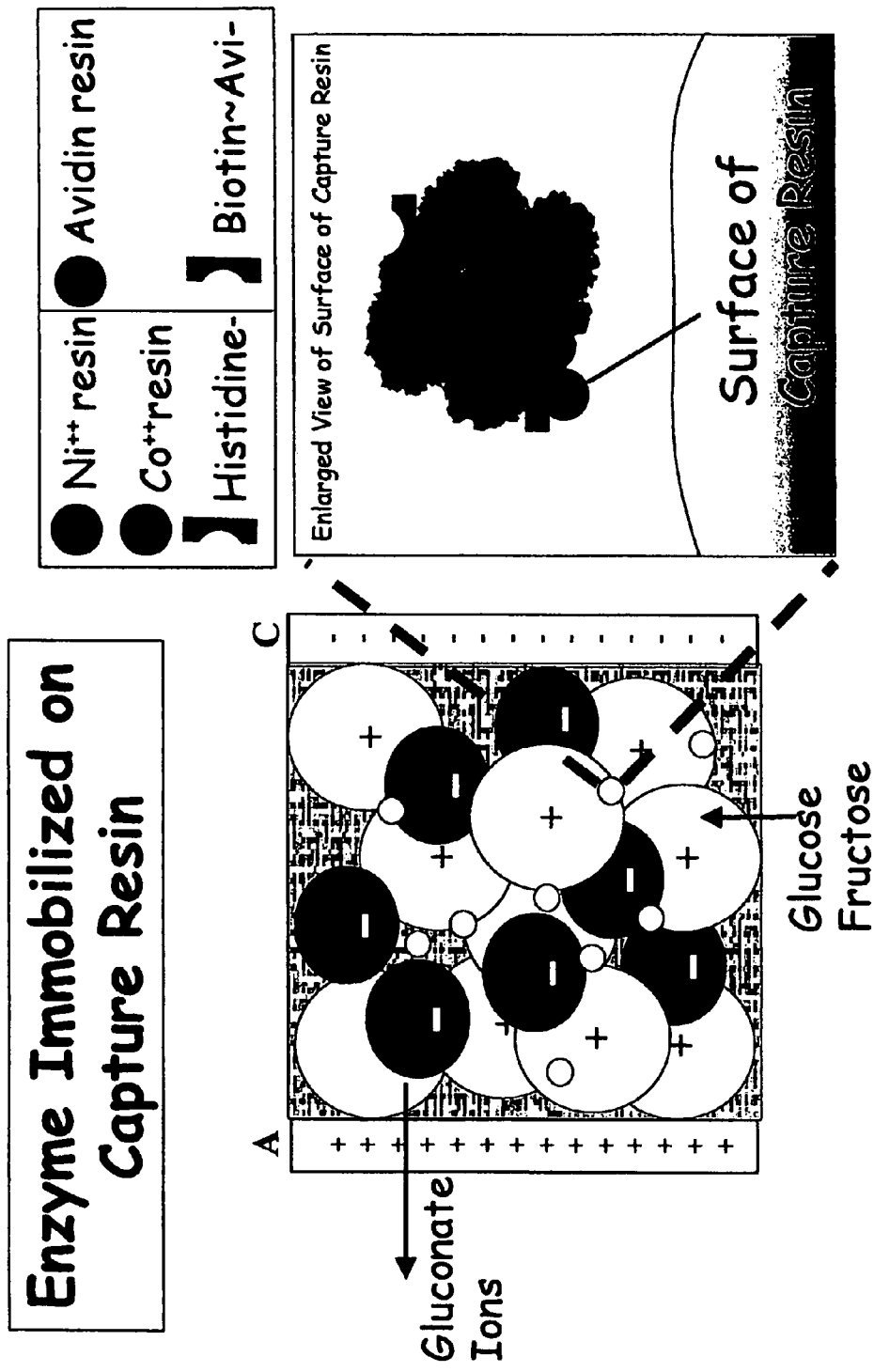
FIG. 4 is a representation of an enzyme immobilized on a capture resin.
Figure 5:
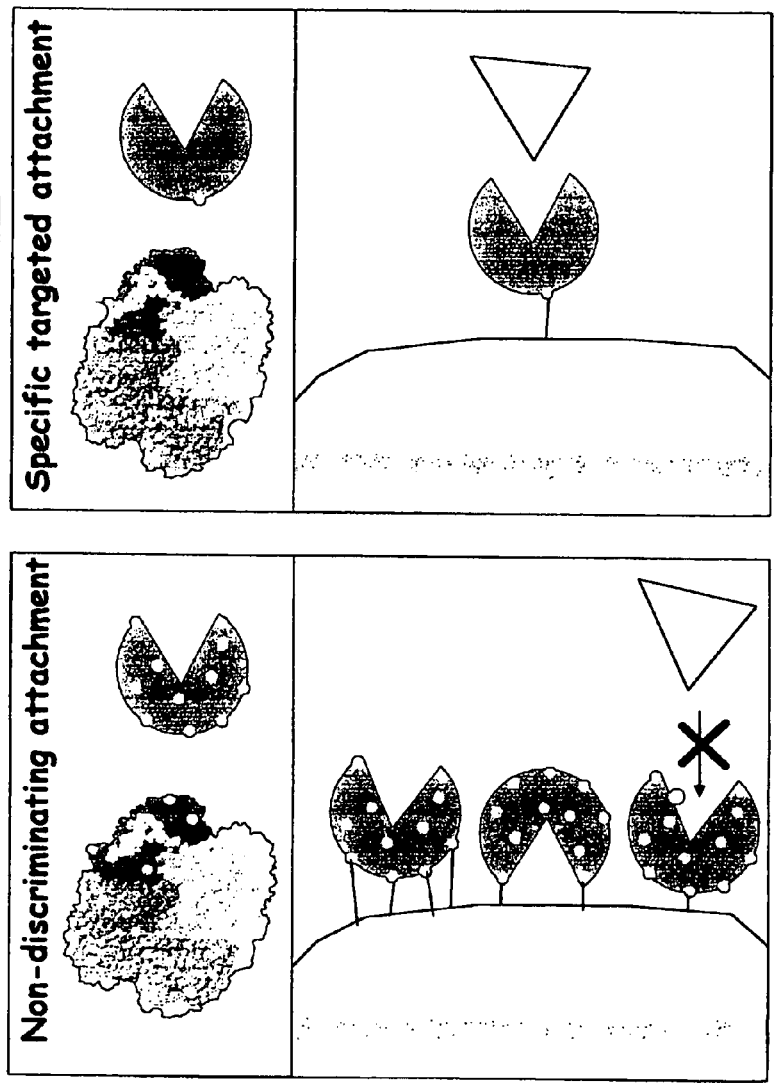
FIG. 5 is a representation of a specific immobilization showing how specific targeted attachment does not inhibit enzyme activity.

Referring generally to FIGS. 1-7, conventionally, biomolecules, such as enzymes, are immobilized on a variety of solid surface matrices in bioreactors using weak (ionic) or strong (covalent) attachment technologies. These non-discriminatory global attachment mechanisms often block enzyme active sites, disrupt enzyme structure, and prevent enzyme motion, which result in a significant loss of specific activity typically leaving the enzymes 10%-30% active.

Glucose Fructose Oxidoreductase (GFOR) (see FIG. 1) is the model enzyme used as a specific, but not limiting example, in this invention. GFOR carries out two reactions, converting glucose to gluconic acid while converting fructose to sorbitol. A genetically added tag on GFOR is an advantage for immobilization in that the enzyme attachment takes place at one specific site on the enzyme (either the N-terminus or C-terminus), leaving the enzyme structure, activity, and active site intact. Several methods of GFOR immobilization have been employed using various tags and capture-resins intercalated within the resin wafer: (1) Histidine-tagged GFOR (His-GFOR) immobilized to $Ni^{++}$-resin (Nickel-resin), (2) His-GFOR immobilized to $Co^{++}$-resin (Cobalt-resin), and (3) Biotinylated avidin-tagged GFOR (Biotin~Avi-GFOR) immobilized to avidin-resin. By this tagged-enzyme method, GFOR activity remained at ~100% when immobilized. In general, any cation with a valence of 1-2 may be used; however, transition metal ions and certain alkaline earth ions are preferred and more preferred are Ni, Co, Cu, Zn, Ca, Mg with Ni, Co, Zn ions being mostly preferred.

Most immobilized enzymes have lifetimes ranging from 1-2 months while membranes have lifetimes ranging from 1-2 years. Enzymes become the limiting factor in the length of bioreactor lifetimes. Regenerating the enzyme-immobilized-ion-exchange resin wafer becomes a dilemma, because the resins must be completely removed and the whole stack disassembled in order to add back active enzymes, then the whole stack must be reassembled. Thus, if the enzyme can be immobilized and regenerated ten times in situ on the same matrix, this significantly reduces the labor and cost to replace inactive enzyme (see FIG. 6). In addition, because of the conventional covalent immobilization of enzymes, stripping off inactive enzymes damages the potential enzyme-binding sites on the matrix. Enzyme regeneration in the separative bioreactor is efficient with tagged enzymes because a histidine homologue (imidazole) non-destructively flushes the immobilized His-tagged enzymes from the $Co^{++}$ and $Ni^{++}$ capture-resin. Likewise, biotin displaces the biotinylated Avi-tagged enzyme from the avidin capture-resin. Once a tagged-enzyme or other biomolecule loses activity, it is flushed from the resin wafer, and within the same resin wafer, the capture-resin is ready to immobilize the next batch of active tagged-enzyme or other biomolecule. Engineering the biomolecule, such as enzyme with a tag provides the ability to regenerate enzymes or other biomolecule in situ within the separative bioreactor without having to disassemble the stack, replace the resin wafer, and reassemble the stack.

As previously indicated, the porous solid ion exchange wafer with a combination of a biomolecule capture-resin and an ion-exchange resin which forms a charged capture resin within the wafer is basically a flexible porous ion-exchange material containing one or more of anion-exchange entities or cation-exchange entities or mixtures thereof immobilized with respect to each other with a binder comprising 25% to about 45% by weight of the porous-ion exchange material without substantially coating the entities. The wafer, as previously described, is disclosed in the incorporated U.S. Pat. No. 6,495,014. Preferably, the porous wafer contains at least 15% porosity and the binder is present in the weight ratio to the entities of about 1:3. More particularly and more preferably, the porous wafer has a porosity in the range of from about 15% to about 60% and the wafer contains one or more of a strong acid resin, a weak acid resin, a strong basic resin or a weak basic resin.

The preferred wafer contains a biomolecule capture-resin which contains an affinity chromatography resin or an immobilized metal ion affinity chromatography resin or mixtures thereof. More particularly, the biomolecule capture-resin includes one or more of glutathione, calmodulin, cellulose, anti-FLAG, amylose, T7 antibody, S-protein, bis-arsenical fluorescein dye FLAsH, chitin, an avidin resin or streptavidin or mixtures thereof. Most preferably, the avidin resin is monomeric and in general is present in the range of from about 5% by weight to about 40% by weight of the wafer and most preferably is present in about 20% by weight by weight of the wafer. On the other hand, the ion exchange resin is preferably present in the range of from about 30% by weight to about 80% by weight of the wafer and most preferably in the range of from about 55% to about 70% by weight of the wafer. The weight ratio of the biomolecule capture-resin to the ion exchange resin is preferably in the range of from about 15 to about 25.

With respect to the genetically engineered tag, the tag may be a histidine or multiple histidines in sequence or interspersed within a sequence or may be a sequence of amino acids at least one of which is biotinylated. In addition, the tag may be one or more of Glutathione S-Transferase(GST) tag, calmodulin binding peptide(CBP) tag, cellulose binding domain(CBD) tag, FLAG sequence tag, maltose-binding protein(MBP) tag, T7 tag, S-Tag, CCXXCC-tag, epitope tag, Chitin-binding domain tag combined with modified intein domains for reversible capture by the biomolecule capture-resin. Moreover, two or more biomolecules may be immobilized and may be one or more of an enzyme, a protein, a nucleic acid, a carbohydrate, a lipid catalytic antibody, catalytic DNA, protein nucleic acid or a ribozyme.

In addition, the biomolecule may be an enzyme that interacts with cofactors.

Figure 7:
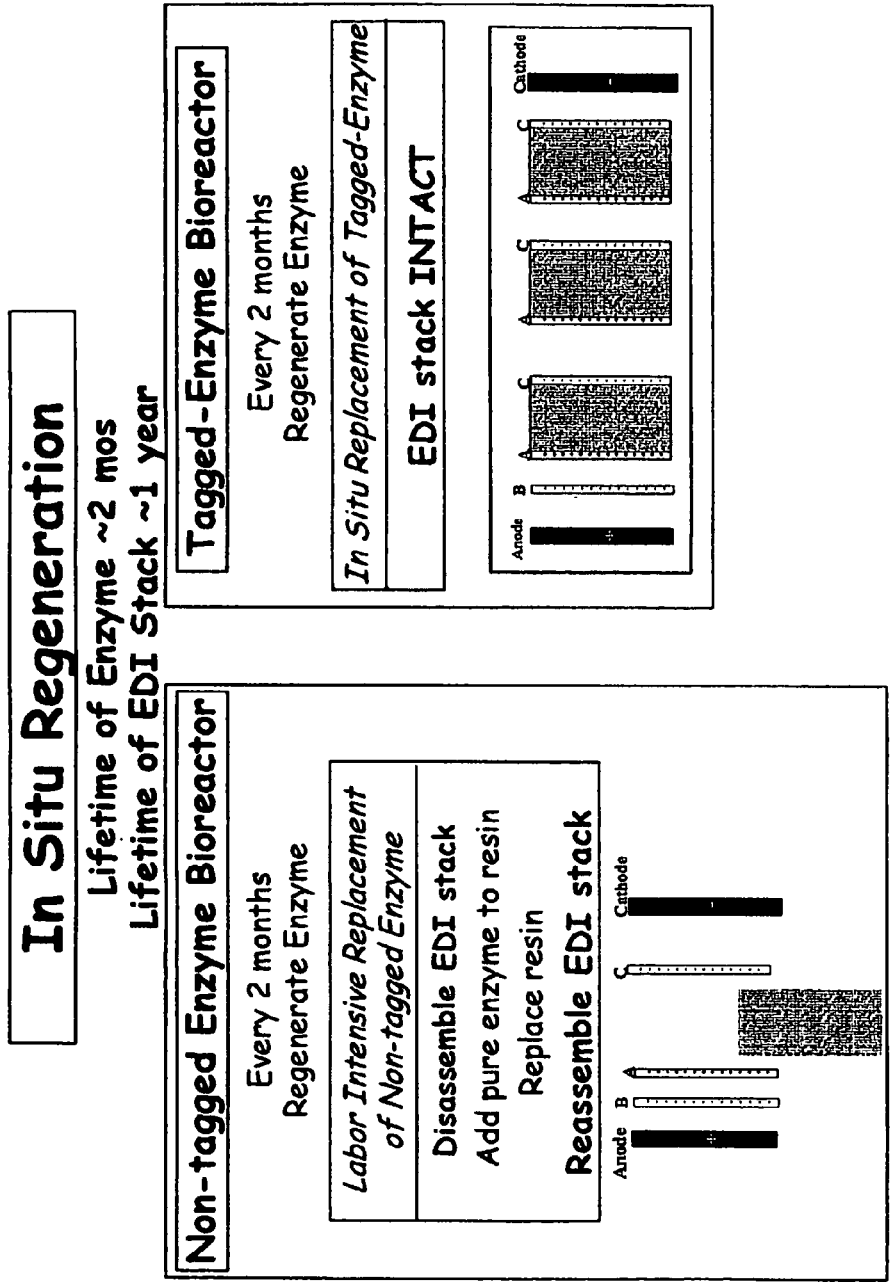
FIG. 7 is a representation of the in situ regeneration of an intact EDI stack.

The materials may be combined as illustrated in FIG. 7 in a bioreactor comprising an anode and a cathode with a plurality of reaction chambers, at least some of which are formed from a porous solid ion exchange wafer having a combination of the biomolecule capture-resin and an ion-exchange resin forming the charged capture resins within the wafers. Genetically tagged biomolecules are immobilized thereon by a process hereinafter set forth, (see FIGS. 2-5) such that each of the porous solid ion exchange wafers has a charged capture resin there within interleaved between a cation exchange membrane and an ion exchange membrane. The separate bioreactor has mechanism for supplying electric potential between the anode and the cathode, all as well known in the art.

Also described hereinafter is a process for in situ stripping of the genetically tagged biomolecule after enzyme have been exhausted to a predetermined extent which is accomplished by contacting the porous solid ion-exchange wafer in the bioreactor with a stripping fluid critical to strip the genetically tagged biomolecule therefrom, (see FIGS. 6 and 7). It is preferable that the tagged biomolecule is stripped to at least 50% and more preferably to 75%. In some cases, almost all of the tagged biomolecule may be stripped and temperatures at times may be up to the biomolecule denaturation temperatures.

Stripping solutions may be less than 50 mM biotin for biotinylated tags and may be one mM to 1 M imidazole for histidine tags or less than 10 mM desthiobiotin for biotinylated tags.

More particularly, stripping may be accomplished with not less than 1 mM EGTA for CBP tags. Other stripping may be accomplished with ethylene glycol or low salt concentrations for CBD tags. Further, stripping may be accomplished with cysteine or thiols to cleave intein amino acid sequences.

The capture-resin contains a specified binding capacity. Once the capture-resin is intercalated amongst the ion-exchange resins in the resin wafer, it is possible that the other resins and the binding material (latex) may obstruct potential binding sites. Thus, the binding capacities of the charged capture resins in the resin wafer were tested. Another advantage that the tagged-enzyme provides is the opportunity for in situ enzyme purification. Because enzymes are purified from microorganisms, obtaining a batch of enzymes requires a prolonged purification process requiring several chromatographic columns before enzymes may be immobilized to a membrane. The capture-resin in the resin wafer provides the advantage of one-step purification and immobilization of the enzyme directly in the separative bioreactor system, bypassing the need for purifying the enzyme before immobilization. Immobilization of tagged-GFOR from whole cells (lysate) was determined.

EXAMPLE (1)

Initial studies tested the ability to purify tagged-enzyme directly in the three-resin wafer in columns. His-GFOR in whole cell lysate was added to one of the three (1) cationic exchange resin plus Ni-resin in the resin wafer charged capture resin, (2) cationic exchange resin in a resin wafer without Ni-resin (cation exchange resin), and (3) Ni-only resin (2.5 ml Ni resin in $1^{st}$ and last). We tested the ability of the three-resin wafer in a column to immobilize His-GFOR from cell lysates. The amount of enzyme that could be stripped from the charged capture resin was also determined. Fresh cell lysate containing His-GFOR was added to the stripped resin-wafer for a second immobilization, then stripped again.

| | Immobilized | Strip | Second immobilization | Strip 2 |
|---|---|---|---|---|
| 2.5 ml of Ni-only resin has a binding capacity for 6.25 mg 12.5 mg of His-GFOR. | | | | |
| Ni-only resin | 12 mg | ~12 mg | Not tested | Not tested |
| charged capture resin | 10 mg | ~7.6 mg | Out of ~3 mg added to wafer, all 3 mg immobilized | ~3 mg |
| cation exchange resin | 0.5 mg | Not detectable | Out of ~3 mg added to wafer, ~0.28 mg immobilized | Not detectable |

As seen therefore, the binding capacity of the capture-resin is specific and at full capacity when intercalated with the ion exchange resin and latex binding material in the resin wafer.

Moreover, the Promega avidin-resin retained 25-50% of it's binding capacity when in the resin wafer. The avidin-resin is ~40% smaller than Ni-resin, such that clumping may block binding sites. Because the latex material that was used to form the −charged capture resin wafer was not optimized, the binding capacity can be increased. In order to determine whether GFOR immobilized by the charged capture resin method (with and without current), retained 100% activity, the following Examples are reported.

EXAMPLE (2)

His-GFOR in whole cell lysate was added to a Ni-resin+cationic exchange resin to form a charged capture resin wafer (2.5 ml Ni resin) in a column (no electrical current). Immobilized His-GFOR remained active only 12 hours without buffer.

EXAMPLE (3)

~8-9 mg of His-GFOR was immobilized on ~50% Ni-resin/~35% anion exchange resin ~15% cation exchange resin to form a charged capture resin wafer in a stack (20 ml Ni resin) in the EDI process (under electrical current). Normally at room temperature the specific activity of 1 g of non-immobilized His-GFOR in buffered solution produces 2 g of gluconate/min. The specific activity of 1 g of immobilized His-GFOR without buffer in the EDI process was normal and also produced 2 g of gluconate/min. His-GFOR was active for three days in the EDI process without buffer. The graph shows the gluconic acid production from immobilized GFOR in an EDI stack as 10 g of pure His-GFOR was added to ~50% Ni-resin/~35% anionic exchange resin/~15% cationic exchange resin to form a charged capture resin wafer in a stack (20 ml Ni-resin) in the EDI process (under electrical current). Pure His-GFOR was fed directly to the resin wafer. 20 ml of Ni-only resin has a binding capacity of 50-100 mg. All 10 g of His-GFOR bound to the capture-resin in the charged capture resin wafer.

EXAMPLE (4)

As histidine has an affinity for Nickel, histidine also has an affinity for cobalt ($Co^{++}$). $Co^{++}$-resin was also used to immobilize His-GFOR. Binding capacity of the $Co^{++}$-resin was similar to the nickel-resin. $Co^{++}$-resin is an option because this metal does not leach off of the resin, like Nickel does in the Ni-resin.

EXAMPLE (5)

Avi-GFOR was expressed and biotinylated in vivo by commercially available protein expression microorganism systems (e.g. BL21(DE3)pLysS. Qiagen or AVB101 Avidity, Colorado). Biotion~vi-GFOR in cell lysate was added to 0.5 ml avidin-resin intercalated with ion exchange resin to form a charged avidin capture resin wafer in a column.

| Promega Avidin-resin binding capacity is 0.4-0.8 mg per ml resin. | | |
| --- | --- | --- |
| | Immobilized | Strip |
| charged avidin capture resin | 0.2 mg | 0.1 mg at 40° C. for 30 min. |
| charged avidin capture resin | 0.2 mg | 0.15 mg at 40° C. for 1 hr. |

At pH 5, organic acid concentration is <1 mg/L. Thus to maintain pH an extremely high flow-rate is needed when the enzyme in aqueous solution. This leads to a lower productivity than could typically be obtained in fermentation. We demonstrated that when we fed pH at a value of >4.8, our productivity was only 0.02 g/L-feed hr (gluconic acid production) when the enzyme was circulated through in aqueous solution. However, when we immobilized enzymes using the nickel-histidine tag of the above-described technique, we had a productivity of 0.4 g/L-feed hr (gluconic acid) at pH 3.3 (enzyme inactive at this pH in aqueous solution). Not only is this a 20 times enhancement in productivity, but it is also a demonstration that immobilized EDI separation allows enzymes to work at pH levels where they otherwise would be inactive.

Using the inventive process, immobilized His-GFOR was 100% active in the EDI process for an extended time without buffer. Immobilized enzymes remain 100% active, but without the EDI process to maintain pH and separate inhibitory products, the lifetime of activity is limited. Immobilized Avi-GFOR specific activity was normal when immobilized on charged capture resin, not under electrical current.

Using tagged enzymes in the separative bioreactor process offers several advantages. The tagged-enzyme capture-resin method was shown not to damage enzyme structure during immobilization as shown by the immobilized enzymes retaining normal activity. The capture-resin within the resin wafer provided a site-specific immobilization technique within the separative bioreactor. Finally, the tagged-enzyme was stripped in situ, and fresh tagged-enzyme added in situ, without having to disassemble and reassemble the separative bioreactor system.

Although specific examples ion-exchange resins are disclosed herein, the invention encompasses all the ion-exchange resins in the previously filed U.S. patent application Ser. No. 10/213,721 filed Aug. 6, 2002, the entire disclosure of which is incorporated herein by reference, including the PCT application WO 01/12292 and the Terada et al. U.S. Pat. No. 6,071,397 referenced therein.

Although specific examples of enzyme capture resins are disclosed, any resin system used to purify genetically tagged enzymes are useful in the present invention. The his tag and the biotin tag are both examples of the more generic affinity tags which are engineered to be part of the protein of interest and are used as capture tags in the process of affinity chromatography.

Common for all types of Affinity Chromatography is that an affinity ligand (i.e. the avidin or the $Ni^{+2}$) specific for a binding site (e.g. the his tag or biotin) on the target molecule is coupled to an inert chromatography matrix or affinity matrix, the third resin in the inventive wafer.

Under well known suitable binding conditions, this affinity matrix will bind molecules according to its specificity only. All other sample components will pass through the medium unabsorbed.

After a 'stripping' or flushing wash step the adsorbed molecules are released and eluted by changing towards disassociation or by adding an excess of a substance that displaces the target molecule from the affinity ligand.

Three groups of properties of the target molecule are used in design of an affinity matrix. There are matrixes that exploit specific binding properties based on biological activity. For example, receptor binding, antibody binding, AvidinBiotin interaction etc. There can also be naturally occurring prosthetic groups in the molecule of interest or enzyme e.g. polysaccharides et al. There are also bioengineered molecules equipped with an affinity tag: Glutahione-S-Transferase (GST) or Oligo histidine (that tag) etc.

There are two types of affinity ligand in use today. Mono specific affinity ligands are closely related to the structure of the molecule of interest and as such are not often available commercially. In this case, one skilled in the art must make his own affinity matrix the use of well established coupling chemistries e.g. CNBr: Thiol Exchange etc.

Group specific affinity ligands have a much wider applicability and are therefore commercially available. Examples of common group ligands are in the following table.

| Group Specific Ligand | Specificity |
| --- | --- |
| Protein A | Fc region of IgG |
| Protein G | Fc region of IgG |
| Concanavalin A | Glucopyranosyl and Mannopyranosyl groups |
| Cibacron Blue | Broad range of enzymes, serum albumin |
| Procion Red | NADP + dependent enzymes |
| Lysine | Plasminogen, ribosomal RNA |
| Arginine | Serine proteases |
| Benzamidine | Serine proteases |
| Calmodulin | Proteins regulated by calmodulin |
| Heparin | Coagulation factors, lipoproteins, lipases, hormones, steroid receptors, protein synthesis factors, Nucleic acid-binding enzymes |
| Transition metal ions | Proteins and peptides which contain accessible Histidine |

Stripping solutions are generally specific to the resin or material being stripped, such as up to biomolecule denaturation temperatures for avidin resin.

1-10 mM desthiobiotin for biotinylated tags.

1-50 millimolar biotin or pH 2.0 for biotinylated tags.

5-10 M guanidine-HCl, pH 1.5 for avidin resin.

1 mM to 1 M imidazole for histidine tags.

1 mM to 1M EGTA (Ethylene glycol-O,O'-bis-[2-aminoethyl]-N,N,N',N',-tetraacetic acid) for CBP tags.

100% ethylene glycol or low salt conditions (<5 mM) for CBD tags.

low concentrations of dithiothreitol (1-10 mM) for CCXXCC tags.

chitin binding domain tags using intein amino acid sequences are released from chitin-resin by thiols of free cysteine.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A method of in situ stripping a genetically tagged biomolecule from a porous solid ion exchange wafer in a bioreactor, the wafer having a combination of a biomolecule capture-resin and an ion-exchange resin forming a charged capture resin within the wafer and having a genetically tagged biomolecule immobilized on said biomolecule capture-resin, comprising contacting the porous solid ion exchange wafer in the bioreactor with a stripping fluid at a temperature and for a time sufficient to strip at least some of the genetically tagged biomolecule therefrom.

2. The method of claim 1, wherein at least 50% of the tagged biomolecule is stripped therefrom.

3. The method of claim 1, wherein at least 75% of the tagged biomolecule is stripped therefrom.

4. The method of claim 1, wherein substantially all of the tagged biomolecule is stripped therefrom.

5. The method of claim 1, wherein stripping occurs at temperatures up to biomolecule denaturation temperatures.

6. The method of claim 1, wherein stripping is accomplished with less than 50 mM biotin for biotinylated tags.

7. The method of claim 1, wherein stripping is accomplished with 1 mM to 1 M imidazole for histidine tags.

8. The method of claim 1, wherein stripping is accomplished with not less than 1 mM EGTA (ethylene glycol-O, O'-bis-[2-amino-ethyl]-N,N,N',N'-tetraacetic acid) for calmodulin binding peptide (CBP) tags.

9. The method of claim 1, wherein stripping is accomplished with ethylene glycol or low salt concentrations of less than about 5 mM for cellulose binding domain (CBD) tags.

10. The method of claim 1, wherein stripping is accomplished with cysteine or thiols to cleave intein amino acid sequences.

11. The method of claim 1, wherein stripping occurs at less than 10 mM desthiobiotin for biotinylated tags.

12. A method of in situ stripping a genetically tagged biomolecule from a porous solid ion exchange wafer in a bioreactor and thereafter regenerating a genetically tagged biomolecule onto the porous solid ion exchange wafer, the wafer having a combination of a biomolecule capture-resin and an ion-exchange resin forming a charged capture resin within the wafer and having a genetically tagged biomolecule immobilized on said biomolecule capture-resin thereon, comprising contacting the porous solid ion exchange wafer in the bioreactor with a stripping fluid at a temperature and for a time sufficient to strip at least some of the genetically tagged biomolecules therefrom, and thereafter contacting the stripped porous solid ion exchange wafer in the bioreactor with an effective amount of a genetically tagged biomolecules at a temperature and for a time sufficient to immobilize genetically tagged biomolecules on the charged capture resin.

13. The method of claim 12, wherein the regenerated biomolecule is the same as or different from the stripped biomolecule.

14. The method of claim 12, wherein the biomolecule—capture resin contains one or more of a cation of valence +2 capable of capturing a genetically engineered tag, an affinity chromatography resin, an immobilized metal ion affinity chromatography resin or mixtures thereof.

* * * * *

UNITED STATES PATENT AND TRADEMARK OFFICE
CERTIFICATE OF CORRECTION

| | | |
|---|---|---|
| PATENT NO. | : 7,799,548 B2 | Page 1 of 1 |
| APPLICATION NO. | : 11/732992 | |
| DATED | : September 21, 2010 | |
| INVENTOR(S) | : Michelle B. Arora et al. | |

It is certified that error appears in the above-identified patent and that said Letters Patent is hereby corrected as shown below:

Claim 12, column 10, line 13, after the phrase --capture-resin-- delete the word "thereon,".

Signed and Sealed this
Twenty-eighth Day of December, 2010

David J. Kappos
*Director of the United States Patent and Trademark Office*